No. 645,014. Patented Mar. 6, 1900.
W. B. & L. C. REED.
SYSTEM OF ELECTRICAL DISTRIBUTION.
(Application filed Oct. 6, 1899.)
(No Model.)
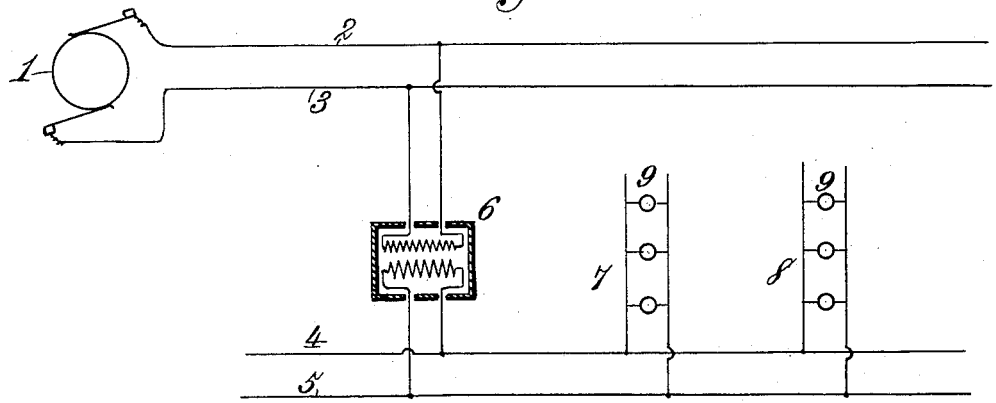
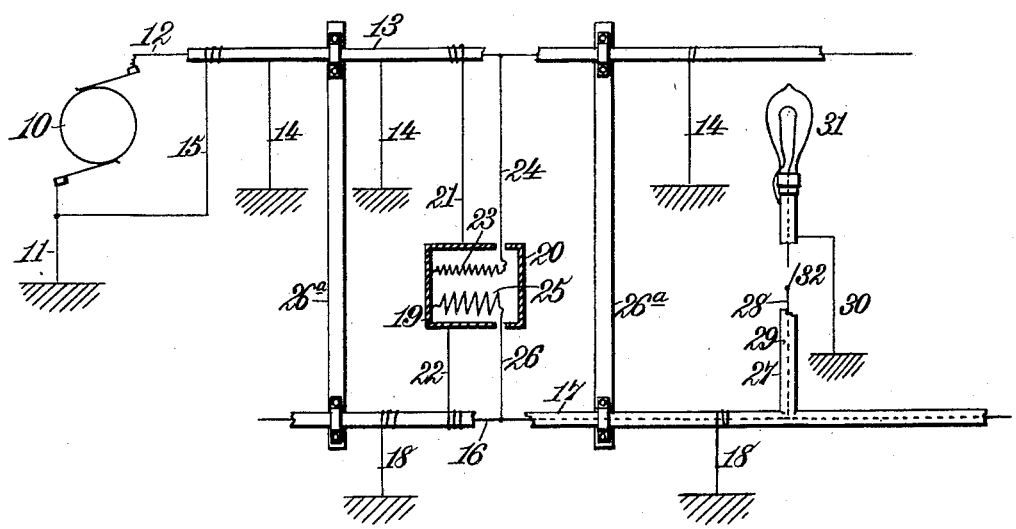
Witnesses.
Robert Everett.
Inventors.
Warren B. Reed.
Lyman C. Reed.
By James L. Norris,
Atty.

UNITED STATES PATENT OFFICE.

WARREN B. REED AND LYMAN C. REED, OF NEW ORLEANS, LOUISIANA.

SYSTEM OF ELECTRICAL DISTRIBUTION.

SPECIFICATION forming part of Letters Patent No. 645,014, dated March 6, 1900.

Application filed October 6, 1899. Serial No. 732,815. (No model.)

*To all whom it may concern:*

Be it known that we, WARREN B. REED and LYMAN C. REED, citizens of the United States, residing at New Orleans, in the parish of Orleans and State of Louisiana, have invented new and useful Improvements in Systems of Multiple-Arc Alternating-Current Transmission and Distribution, of which the following is a specification.

In the present system of high-tension transmission by alternating currents, either single or multiphase, the wires have to be highly insulated from each other, from the earth, and from other wires in order to avoid the losses due to leakage. Alternating systems, however, are subject to losses other than those due to leakage and ohmic resistance. Inductive resistances, "skin effect," and condenser capacity all have to be taken into account. Without going into the theory of these phenomena, it may be stated briefly that in order to partly overcome the self-induction of the wire itself several wires have to be used instead of one large wire. The skin effect also forbids the use of too large a conductor, and from the fact that in overhead construction the wires have to be kept well apart the induction between the wires is increased by a factor varying with the distance between the wires. Where there is more than one circuit on the same pole, there are other inductive effects between the several circuits, as well as in the wires themselves. These effects, due to the alternating flux in the magnetic field surrounding the wires, also induce currents in other circuits, such as telephone-circuits, and frequently interfere with their proper operation. In underground systems these inductive effects are usually small as compared with similar effects in overhead systems, since the conductors are placed closer together than they can be in the overhead system. Still even in underground systems these effects are considerable. Since these effects cause the same loss as an increase in the ohmic resistance, it is of vital importance to eliminate them so far as possible. Besides the inductive losses the wires have a condenser capacity not only between themselves, but between the circuit as a whole and the earth. In overhead systems this condenser capacity is very small compared with that in the present underground systems; but on an extended system the discharge to earth may be of sufficient capacity to cause a breakdown of the insulation when such discharge takes place over the interior wiring. Where the wires in metallic cables are placed underground, this condenser capacity is greatly increased and is not only a continuous strain on the insulation, but is also a consumer of current. By our improved system we overcome the objections and disadvantages above noted by employing metallic-sheathed cables for transmission and distribution the sheathings of which are utilized as one conductor of the system, are grounded at every available point, and are connected together or bonded to form one common conductor.

The details of the invention will be more fully set forth hereinafter, and that which we regard as new will be defined in the claims.

In the drawings forming part of this specification, Figure 1 is a diagrammatic view illustrative of the present system of alternating-current transmission and distribution, and Fig. 2 is a similar view showing our improved system.

From the generator 1 lead the high-tension mains 2 and 3, supplying the low-tension mains 4 and 5 through the transformer 6. Connected with the low-tension mains 4 and 5 are house-circuits 7 and 8, in which the translating devices 9 are interposed. In this system it will be observed that separate conductors 2 and 3 and 4 and 5 are employed for the high-tension and low-tension mains and that two separate conductors are employed for the house-circuits, which wires are necessarily highly insulated from each other.

In Fig. 2, wherein our improvements are illustrated, it will be observed that the generator 10 has one brush grounded through the wire 11. From the other side of the generator leads the high-tension conductor 12, inclosed in a metallic sheathing or covering 13, from which it is insulated. For this conductor we may use an ordinary metallic-sheathed cable or any form of concentric conductor. The sheathing 13 constitutes one conductor of the high-tension system, and the same is grounded at various points, as shown at 14. It is also connected, and thereby grounded, at the generator through the wire 15, attached to the ground-wire 11. The low-tension system is made up of one or more conductors 16, surrounded by and insulated from a metallic sheath or covering 17, the said sheath or covering constituting one of the conductors of the low-tension system and grounded, as shown at 18. Between the high-tension and low-tension systems is a transformer 19, having a metallic shell or casing 20, which is electrically connected through the wires 21 22, respectively, with the metallic sheath 13 of the high-tension system and with the metallic sheath 17 of the low-tension system. The primary coil 23 of said transformer is also connected to the metallic case 20 and through the wire 24 with the interior conductor 12 of the high-tension system. The secondary coil 25 of said transformer is also connected to the shell 20 thereof and through the wire 26 with the interior conductor 16 of the low-tension system. In this way the grounded metallic casings of the cables of the high and low tension systems are bonded together. They are also bonded together at other points, as shown at 26$^a$. From the low-tension system leads a house-circuit 27, made up of an inner conductor 28, connected to the inner conductor 16 of the low-tension mains, and an outer metallic sheathing 29, insulated therefrom, connected to the sheathing 17, and grounded, as shown at 30. This house-circuit connects with the interior wiring, in which is located a lamp or other translating device 31, one end of the filament of said lamp being connected to the interior conductor 28 and the other end of said filament to the outer sheathing 29. A single-pole switch 32 is employed for controlling the insulated conductor at the entrance of the house.

In our improved system we use for overhead or underground construction one metallic-sheathed cable where the system is two-wire, utilizing the metallic sheathing for one conductor grounded at every available point. For multiphase systems we employ a plurality of cables, utilizing the bonded and grounded sheathings of all the cables for the conductor of one phase. The bonding and grounding of all the cable-sheathings of these systems at every available point insure the keeping of said sheathings or one conductor of the system at the same potential as the earth. Therefore in a single-phase or two-wire system we have one conductor at a given potential from the earth and the other conductor at the same potential as the earth and joined in parallel with the earth at every point of grounding. The translating devices are therefore in multiple arc between the insulated conductor and the earth, and any leakage or breakdown is of the same nature as the current flowing through translating devices and cannot in any way affect the potential of the grounded outer conductor. Besides, we avoid all induction due to the circuits and the consequent loss due to this cause. We also avoid all interference with other circuits and secure protection to the interior conductors and to other circuits from crosses. Moreover, we obtain a great saving in construction, due to the fact that one large conductor may be used for a circuit instead of many small wires, which are now necessary to eliminate induction; a saving in the skin effect, due to the use of large conductors, in the present system; the elimination of all insulation except between the metallic sheathing and its interior conductor; the protection of this insulation from the deteriorating influences of the weather by the use of the outer casing; the elimination in overhead construction of all cross-arms, pins, and high-grade insulators, and the great advantage of being able to place all of the cables, not only of the system under consideration, but also of every system, high or low tension, together and bond and ground them by means of the same pole. This does not increase the difference of potential between any interior conductor and its outer casing; but it absolutely insures that each interior conductor of any system remain at the difference of potential with its casing which is impressed at the source of supply. Furthermore, the use of the metallic-sheathed cables, with the outer casing grounded and constituting one conductor, reduces the condenser capacity to a minimum, effects a diminution of condenser-current, and lessens the strain on the insulation. The protection of the high-potential conductors according to our improved system by a grounded sheath has the further advantage of avoiding the danger to life now existent in high-tension systems. Breakdowns in transformers are also made less likely, and should one occur it could do no damage to the interior wiring, since it would cause the melting of the primary fuses controlling the transformer. The low-tension distribution is protected by a metallic sheathing which constitutes one conductor, as in the high-tension system, and is connected to the sheathing of the high-tension cable at the transformer and at other points. The low-tension system may be two or three wire, single or multiphase, as desired; but in any case the exterior casing of the cable or cables forms one conductor. House-services are taken off this low-tension system and are of any number of wires, according to the system used. The interior wiring is a system of concentric wiring with one separate conductor eliminated, and the cable-sheathing or a metallic conduit is used for said conductor, the same being connected to the outside grounded sheathing and otherwise grounded at every available point. In other words, in our improved system of alternating-current transmission and distribution, whether single or multiphase, we ground one conductor formed by a metallic cable-sheating, which entirely surrounds the insulated interior conductor or conductors, and carry this grounded protecting-sheathing and conductor from the high-tension dynamo to the translating device in the house-wiring.

In the foregoing description we have referred to the distribution of low-tension alternating current obtained by means of transformers. It is obvious, however, that our invention is adapted for use in connection with rotary converters employed for the purpose of securing a low-tension direct current.

Having thus described our invention, what we claim as new, and desire to secure by Letters Patent, is—

1. A high-tension system of transmission and distribution of alternating electric current in which one wire or cable as a separate conductor is eliminated, comprising one or more conductors in metallic coverings which are insulated therefrom, and another conductor formed by said coverings, in combination with a transformer, and a low-tension system leading therefrom comprising one or more conductors in metallic coverings which are insulated therefrom, and another conductor formed by said coverings, the coverings of the conductors of the high and low tension systems being bonded independently of said transformer, as and for the purpose set forth.

2. A high-tension system of transmission and distribution of alternating electric current in which one wire or cable as a separate conductor is eliminated, comprising one or more conductors in metallic coverings which are insulated therefrom, and another conductor formed by said coverings, in combination with a transformer, and a low-tension system leading therefrom, comprising one or more conductors in metallic coverings which are insulated therefrom, and another conductor formed by said coverings, the coverings of the conductors of the high and low tension systems being bonded independently of said transformer and grounded, as and for the purpose set forth.

3. A high-tension system of transmission and distribution of alternating electric current, in which one wire or cable as a separate conductor is eliminated, comprising one or more conductors in metallic-sheathed cables, and another conductor formed by the sheathings of said cables, in combination with a transformer, and a low-tension system leading therefrom comprising one or more conductors in metallic-sheathed cables, and another conductor formed by the sheathings of said cables, the sheathings of the cables of the high and low tension systems being bonded independently of said transformer and grounded, as and for the purpose set forth.

4. The combination of a high-tension and a low-tension system of distribution of alternating electric current, each comprising one or more conductors in metallic-sheathed cables and another conductor formed by the grounded sheathings of said cables, a transformer, the primary coil of which is connected with the inner conductor of the high-tension system, the secondary coil of which is connected with the inner conductor of the low-tension system, and both coils of which are connected with the grounded metallic sheathings of the cables of both of said systems, and a bond, independent of said transformer, between the sheathings of the conductors of the high and low tension systems.

5. The combination of a high-tension and a low-tension system of distribution of alternating electric current, each comprising one or more conductors in metallic-sheathed cables and another conductor formed by the grounded sheathings of said cables, a transformer consisting of a metallic shell or casing electrically connected to the sheathings of the cables of both the high and low tension systems, the primary coil of said transformer being connected to said shell and to the interior conductor of the high-tension system, and the secondary coil of said transformer being connected to said shell and to the interior conductor of the low-tension system, and a bond, independent of said tranformer, between the sheathings of the conductors of the high and low tension systems, as and for the purpose set forth.

6. The combination of a high-tension and a low-tension system of distribution of alternating electric current, in which one wire as a separate conductor is eliminated, each comprising one or more conductors in metallic-sheathed cables and another conductor common to both systems, formed by the bonded and grounded sheathings of the cables of both systems, a transformer between the high and low tension systems, a house-circuit leading from the low-tension system and translating devices therein, the said house-circuit comprising one or more conductors in metallic-sheathed cables, and another conductor formed by the sheathings of said cables, the said sheathings being grounded, and leading from the translating devices to the sheathings of the conductor-cables of the low-tension system, and the bonds between the sheathings of the cables of the high and low tension systems being independent of said transformer, as and for the purpose set forth.

In testimony whereof we have hereunto set our hands in presence of two subscribing witnesses.

WARREN B. REED.
    LYMAN C. REED.

Witnesses:
 ALONZO CHURCH,
 HARRY H. WATERS.